(12) United States Patent
Mori (10) Patent No.: US 8,988,553 B2
(45) Date of Patent: Mar. 24, 2015

(54) IMAGING APPARATUS CAPABLE OF CHECKING A REMAINING CAPACITY FOR RECORDING A MOVING IMAGE WHEN A MOVING IMAGE OF A PREDETERMINED NUMBER OF FRAMES IS SHOT IN ONE SHOT OF MOVING IMAGE SHOOTING

(75) Inventor: Kurumi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 966 days.

(21) Appl. No.: 13/075,021

(22) Filed: Mar. 29, 2011

(65) Prior Publication Data

US 2011/0242360 A1 Oct. 6, 2011

(30) Foreign Application Priority Data

Mar. 31, 2010 (JP) ................................ 2010-082823

(51) Int. Cl.
*H04N 5/76* (2006.01)
*H04N 5/77* (2006.01)
*H04N 5/907* (2006.01)

(52) U.S. Cl.
CPC ............... *H04N 5/772* (2013.01); *H04N 5/907* (2013.01)
USPC ............... 348/231.1; 348/333.02; 348/333.04

(58) Field of Classification Search
CPC ....... H04N 1/2112; H04N 5/77; H04N 5/772; H04N 1/2125
USPC .................................................... 348/231.1
See application file for complete search history.

(56) References Cited

U.S. PATENT DOCUMENTS

| 5,905,528 A * | 5/1999 | Kodama ..................... 348/220.1 |
| 6,111,605 A * | 8/2000 | Suzuki ....................... 348/220.1 |
| 7,768,553 B2 * | 8/2010 | Kamiya ..................... 348/220.1 |
| 2001/0000969 A1 * | 5/2001 | Ohta et al. ..................... 348/231 |
| 2002/0012051 A1 * | 1/2002 | Mizoguchi ..................... 348/220 |
| 2002/0031349 A1 * | 3/2002 | Hayashi ........................ 396/429 |
| 2003/0194146 A1 * | 10/2003 | Kosugi et al. ................. 382/246 |
| 2007/0115368 A1 * | 5/2007 | Kamiya ....................... 348/220.1 |
| 2009/0268052 A1 * | 10/2009 | Takahashi ..................... 348/223.1 |
| 2010/0158498 A1 * | 6/2010 | Cha ............................... 396/265 |
| 2010/0214427 A1 * | 8/2010 | Aoki et al. ..................... 348/220.1 |
| 2010/0289917 A1 * | 11/2010 | Hosokawa ..................... 348/222.1 |

FOREIGN PATENT DOCUMENTS

| JP | 10013721 A | * | 1/1998 | ............ H04N 5/225 |
| JP | 2000-299800 A | | 10/2000 | |
| JP | 2001-016490 A | | 1/2001 | |
| JP | 2001-078062 A | | 3/2001 | |
| JP | 2001-352471 A | | 12/2001 | |

* cited by examiner

*Primary Examiner* — James Hannett
*Assistant Examiner* — Cynthia Segura
(74) *Attorney, Agent, or Firm* — Canon U.S.A., Inc. IP Division (57) ABSTRACT

In a frame recording mode for shooting a moving image including the predetermined number of frames in one shot or an interval recording mode, if a time length available for recording a moving image becomes less than predetermined time, not the recordable time but the number of times capable of shooting a moving image including the predetermined number of frames is displayed as information about a remaining capacity of a recording medium.

12 Claims, 8 Drawing Sheets

IMAGING APPARATUS CAPABLE OF CHECKING A REMAINING CAPACITY FOR RECORDING A MOVING IMAGE WHEN A MOVING IMAGE OF A PREDETERMINED NUMBER OF FRAMES IS SHOT IN ONE SHOT OF MOVING IMAGE SHOOTING

BACKGROUND OF THE INVENTION

1. Field of the Invention

The present invention relates to an imaging apparatus that can perform shooting of a moving image.

2. Description of the Related Art

In imaging apparatuses that can shoot both of a moving image and a still image, some imaging apparatuses can change a unit for displaying remaining capacity from recordable time of moving images to the recordable number of still images when a shooting mode is changed from a moving image shooting mode to a still image shooting mode (see Japanese Patent Application Laid-Open No. 2000-299800). Moreover, in apparatuses that can shoot a moving image and a still image at the same time, some apparatuses can display both of remaining time and the recordable number of images (see Japanese Patent Application Laid-Open No. 2001-16490).

In the above mentioned conventional apparatuses, one of or both of the recordable time of moving images and the recordable number of still images are displayed. Accordingly, an issue shown below exists.

In some moving image shooting apparatuses, a technique for intermittently shooting the predetermined number of moving image frames and creating clay animation or a growth record of a plant is provided. In such moving image shooting apparatuses, in the intermittent recording of moving images, it is not possible to specifically check how many shots can be recorded while performing shooting.

SUMMARY OF THE INVENTION

The present invention is directed to an imaging apparatus for shooting a moving image, and more particularly, to an imaging apparatus that can easily check a remaining capacity for recording a moving image in a recording medium when a moving image of the predetermined number of frames is shot in one shot of moving image shooting.

An aspect of the present invention is to solve all or at least one of the above-mentioned issues.

According to an aspect of the present invention, an imaging apparatus includes an imaging unit configured to shoot a moving image, a recording unit configured to record the moving image shot by the imaging unit in a recording medium, and a display unit configured to display a time length available for recording a moving image in the recording medium as information about a remaining capacity of the recording medium, wherein, in a mode for shooting a predetermined number of frames in one shot, the display unit changes the display of the information about the remaining capacity of the recording medium to the number of shot times capable of shooting the predetermined number of frames if the time length available for recording a moving image becomes less than a predetermined time length.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the exemplary embodiment, when an imaging apparatus performs intermittent recording of moving images in a frame recording mode, an interval recording mode, or the like, if the remaining capacity of a recording medium is greater than or equal to predetermined recordable time, the remaining capacity is displayed by time unit. If the remaining capacity is less than the predetermined recordable time, the remaining capacity is displayed by the number of times of recordable shooting.

The intermittent recording, which is a recording mode in recording moving images, is described in detail. First, when moving image shooting is started, a predetermined number of frames of a moving image is shot as a moving image in one shot. Then, after a certain interval, shooting of the predetermined number of frames of a moving image is started. The shot moving images are not to be recorded in a predetermined number of frames, that is, not to be recorded as individual files for each shot. A plurality of the moving images shot in a plurality of shootings at the intervals are connected as one moving image, and recorded as one moving image file.

In the present exemplary embodiment, the intermittent recording mode includes a frame recording mode and an interval recording mode. Further, in the present exemplary embodiment, one group of temporally sequential moving images from the start to the end of the shooting is indicated as a moving image in one shot.

Structure of Digital Video Camera

Figure 1:
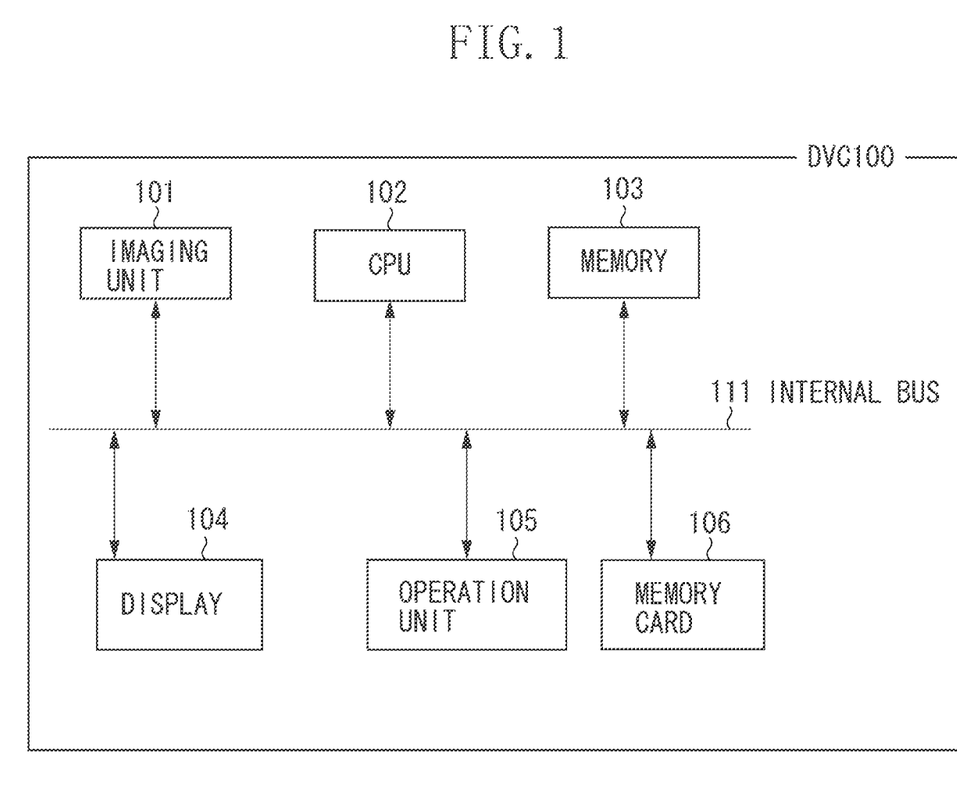
FIG. 1 illustrates a structure of a digital video camera (DVC).

FIG. 1 illustrates an example of a structure of a video camera (hereinafter, referred to as DVC) 100 that is an example of the imaging apparatus according to the exemplary embodiment of the present invention. The DVC 100 includes an imaging unit 101, a central processing unit (CPU) 102, a memory 103, a display 104, an operation unit 105, and a memory card 106. The components are connected with each other by an internal bus 111. The imaging unit 101 can shoot a moving image or a still image, and take in information about the shot image.

The CPU 102 performs various types of processing such as recording and reproduction of image information. For example, the CPU 102 performs recording control processing for recording image information taken by the imaging unit 101 in the memory card 106 as an image file, and display control processing for reading the image file recorded in the memory card and displaying it on the display 104. The CPU reads a program from a program memory (not illustrated) and performs control and calculation of each unit based on the read program to execute various types of processing.

The operation unit 105 includes an operation switch and a button. An instruction from a user can be received via the operation unit. When the CPU detects the input of the instruction, the CPU executes processing corresponding to the instruction. The display 104 displays an image being shot by the imaging unit, an image recorded in the memory card, a graphic user interface such as a menu screen, or the like under the control of the CPU. A touch panel can be provided for the display 104 and the operation unit 105.

The memory card 106 can be attached to or detached from the DVC, and is used as a recording medium for recording an image file. In the present exemplary embodiment, the memory card is used for the recording medium for recording an image. However, a hard disk drive (HDD) built into the DVC, or the like can be used. The memory 103 is used as a work area for the CPU 102.

Shooting Processing

Figure 5:
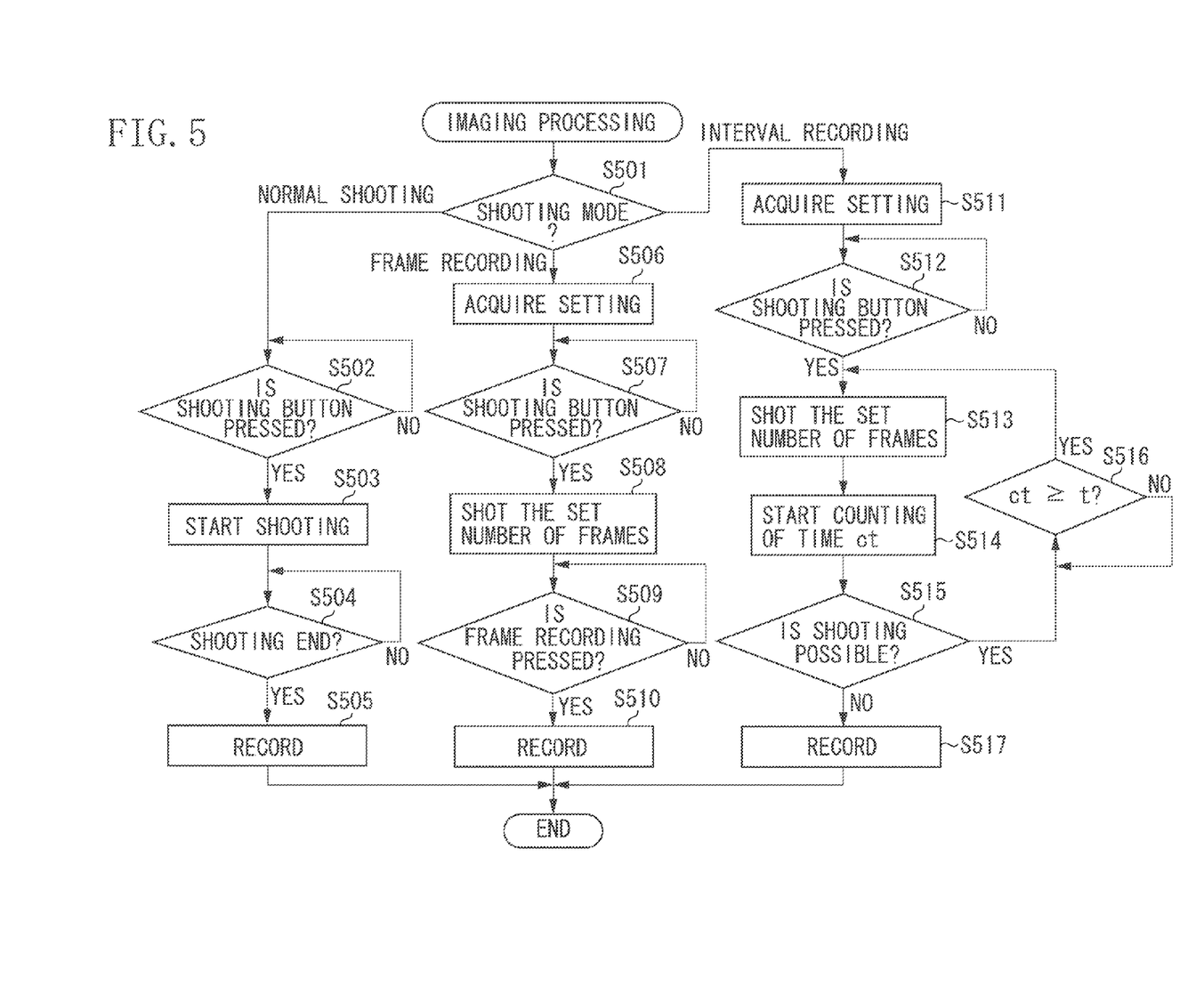
FIG. 5 is a flowchart illustrating moving image shooting processing.

With reference to FIG. 5, processing performed in shooting in the DVC according to the present exemplary embodiment is described. The processing illustrated in the flowchart in FIG. 5 is executed by the CPU 102 by performing control of each unit in the DVC based on the program read from the program memory. In FIG. 5, processing of shooting and recording is described. Display of remaining recording capacity of the memory card on the display in the shooting is described below with reference to FIGS. 3A to 3C.

First, in step S501, the CPU 102 determines a moving image shooting mode. A user can switch the moving image shooting mode by operating the operation unit 105. In step S501, if the moving image shooting mode is determined as a normal moving image shooting mode, the processing proceeds to step S502. If the moving image shooting mode is a frame recording mode, the processing proceeds to step S506. If the moving image shooting mode is an interval recording mode, the processing proceeds to step S511.

Normal Shooting Mode

In step S502, when the user presses a shooting button in the operation unit 105, the CPU 102 detects whether an instruction to start shooting is input. If the CPU 102 detects pressing of the shooting button (YES in step S502), then in step S503, the CPU 102 starts shooting of a moving image. In step S504, the CPU 102 detects whether the shooting button is pressed and an image shooting end instruction is input during the shooting of the moving image. Until the end instruction is inputted, the shooting of the moving image is continued. In response to an input of the shooting end instruction (YES in step S504), the CPU 102 ends the shooting. In step S505, the CPU 102 records the moving images shot from the shooting start to the shooting end as one moving image file in the memory card 106.

Frame Recording Mode

First, in step S506, the CPU 102 acquires the set number of frames f. In the frame recording mode, the number of frames to be shot in one shot can be set. The number of frames f can be previously set by the user on a frame record setting screen (not illustrated), and recorded in the memory 103. If the number of frames has not been set when the DVC is switched to the frame recording mode, the frame record setting screen may be automatically displayed to prompt the user to set the number of frames.

In step S507, until the shooting button is pressed, the DVC is in a shooting standby state. If the shooting button is pressed and the instruction to start shooting is input (YES in step S507), then in step S508, the CPU 102 starts shooting of a moving image in one shot. In step S508, when the shot moving image reaches the set number of frames f acquired in step S506, the shooting of the moving image is automatically ended, and the DVC is in the frame recording standby state again. More specifically, in the frame recording mode, a moving image including "f" frames is shot in the one shot.

Until the frame recording mode ends, the processing in steps S507 and S508 is repeated. During the processing, each time the user presses the shooting button, a moving image including "f" frames is shot. If the frame recording mode ends (YES in step S509), in step S510, the CPU 102 records the all moving images shot from the start to the end of the frame recording mode as one moving image file in the memory card 106. More specifically, the moving images of a plurality of shots of the set number of frames, which are temporally separated from each other and shot from the start to the end of the frame recording mode, are recorded as one sequential moving image.

Interval Recording Mode

First, in step S511, the CPU 102 acquires the set number of frames f and interval time t. In the interval recording mode, the number of frames f to be shot in one shot and the interval time t can be set. The number of frames f and the interval time t can be previously set by the user on an interval record setting screen (not illustrated), and recorded in the memory 103. If these setting values are not set when the DVC is switched to the interval recording mode, the interval record setting screen can be automatically displayed to prompt the user to set the number of frames f and the interval time t.

In step S512, until the shooting button is pressed, the DVC is in the shooting standby state. If the shooting button is pressed and an instruction to start shooting is input (YES in step S512), then in step S513, the CPU 102 starts shooting of a moving image in one shot. In step S513, when the shot moving image reaches the set number of frames f acquired in step S511, the shooting of the moving image is automatically ended, and the DVC is in the frame recording standby state again. More specifically, in the interval recording mode, a moving image including "f" frames is shot in the one shot, as similarly to the frame recording mode.

After the shooting of the moving image in one shot ends, in step S514, the CPU 102 starts counting of time ct from the end of the shooting. If the time ct is equal to or longer than the interval time t (ct ? t) (YES in step S516), in other words, if the interval time has passed after the end of the shooting of the previous one shot, then in step S513, shooting of a moving image in one shot is performed again. When the shooting in one shot ends and the DVC is waiting for the next shooting, the CPU 102 checks the remaining amount of the recording capacity of the memory card 106 while counting the time ct. Then, in step S515, the CPU 102 determines whether a moving image of the next one shot, that is, a moving image of the number of frames f can be shot and recorded.

If the recording can be performed (YES in step S515), the CPU 102 continues the interval recording mode. If the recording cannot be performed (NO in step S515), then in step S517, the CPU 102 records the moving image in the memory card 106, and ends the interval recording mode. In step S517, the CPU 102 records all moving images, which are shot after the interval recording mode is started and the shooting button is pressed, in the memory card 106 as one moving image file. More specifically, the plurality of shots which are shot at the intervals of the interval time t are recorded as one sequential moving image.

As described above, in the interval recording mode, if one image shooting instruction is issued, the shooting proceeds in the order of "shooting a moving image including ""f" frames", "waiting for the interval time t", "shooting a moving image including "f" frames", "waiting for the interval time t", and so on. In other words, after one shot is performed at the set number of frames f and when the interval time t has passed, shooting of the next shot automatically starts. In the interval recording mode, the shooting is performed until there is no recording capacity in the memory card.

In the present exemplary embodiment, the shooting is performed until there is no recording capacity in the memory card. However, in response to an operation to end the interval recording mode, the recording processing in step S517 can be performed, and the interval recording can be ended.

Display Processing

Figure 6:
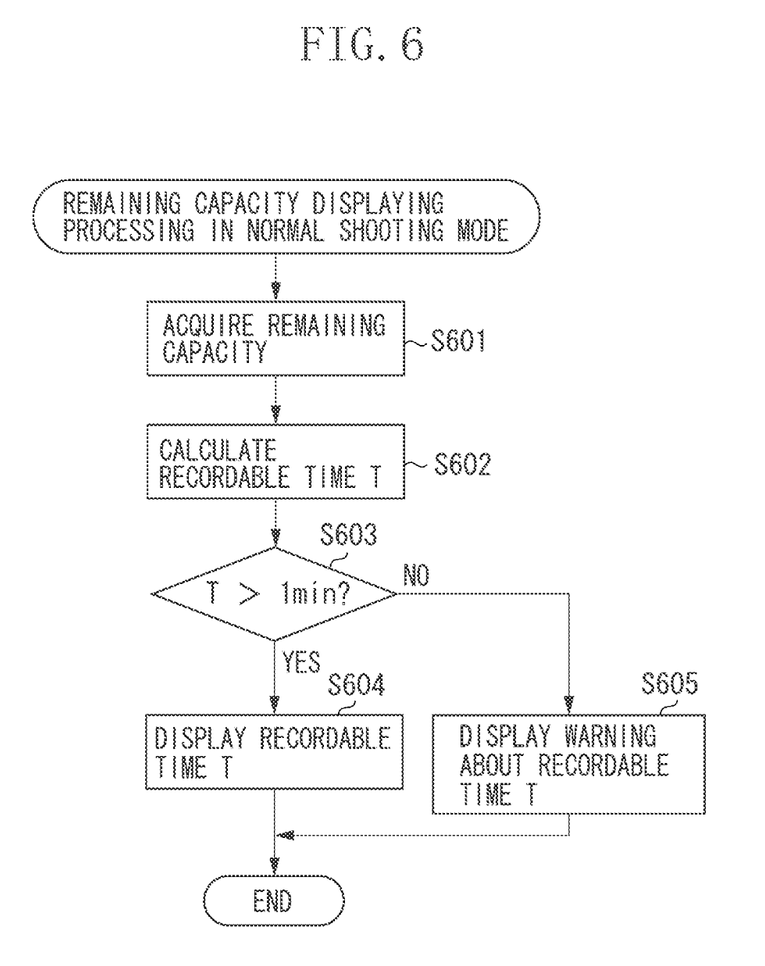
FIG. 6 is a flowchart illustrating remaining capacity display processing in a normal shooting mode.
Figure 7:
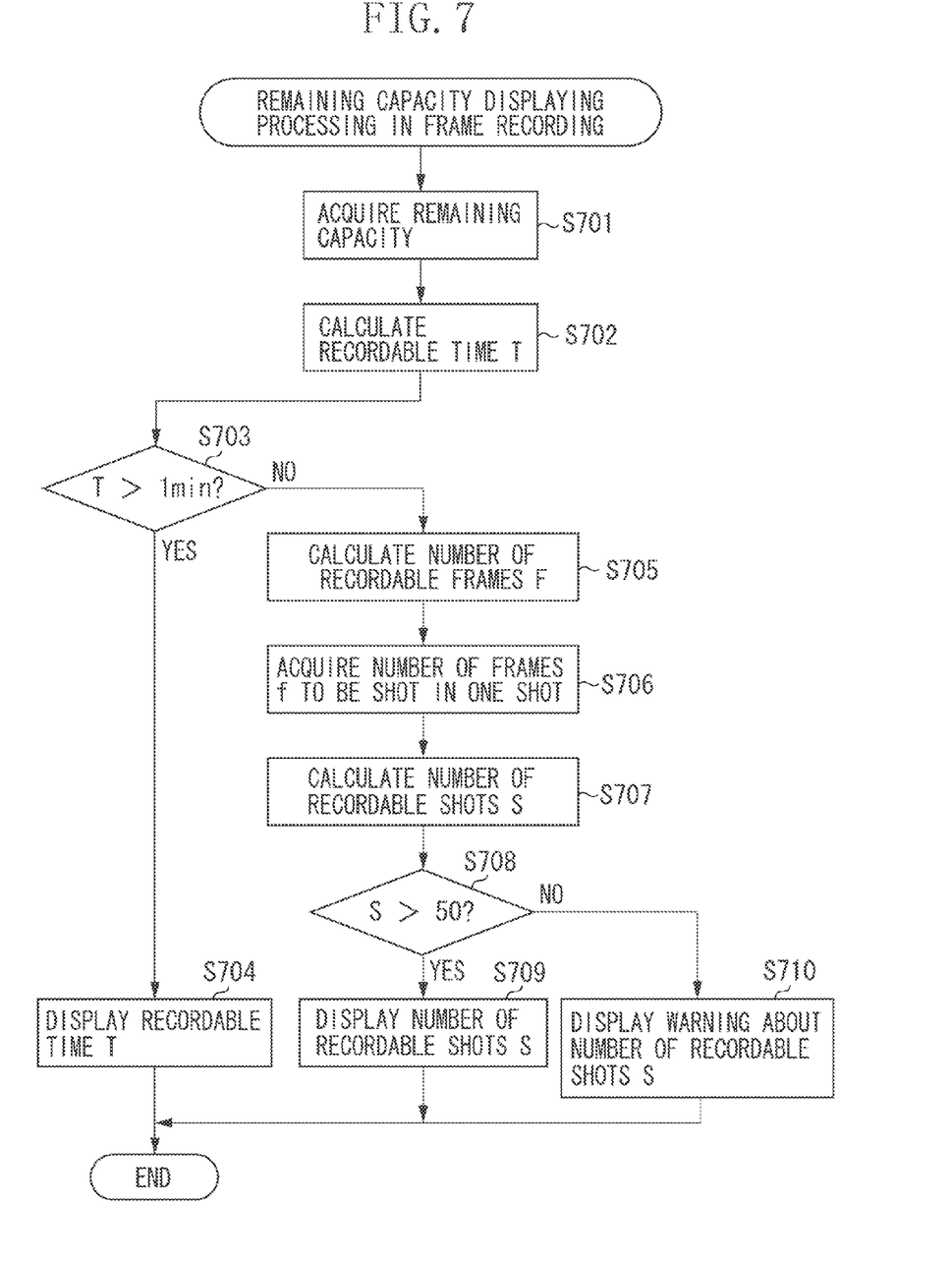
FIG. 7 is a flowchart illustrating remaining capacity display processing in a frame recording mode.
Figure 8:
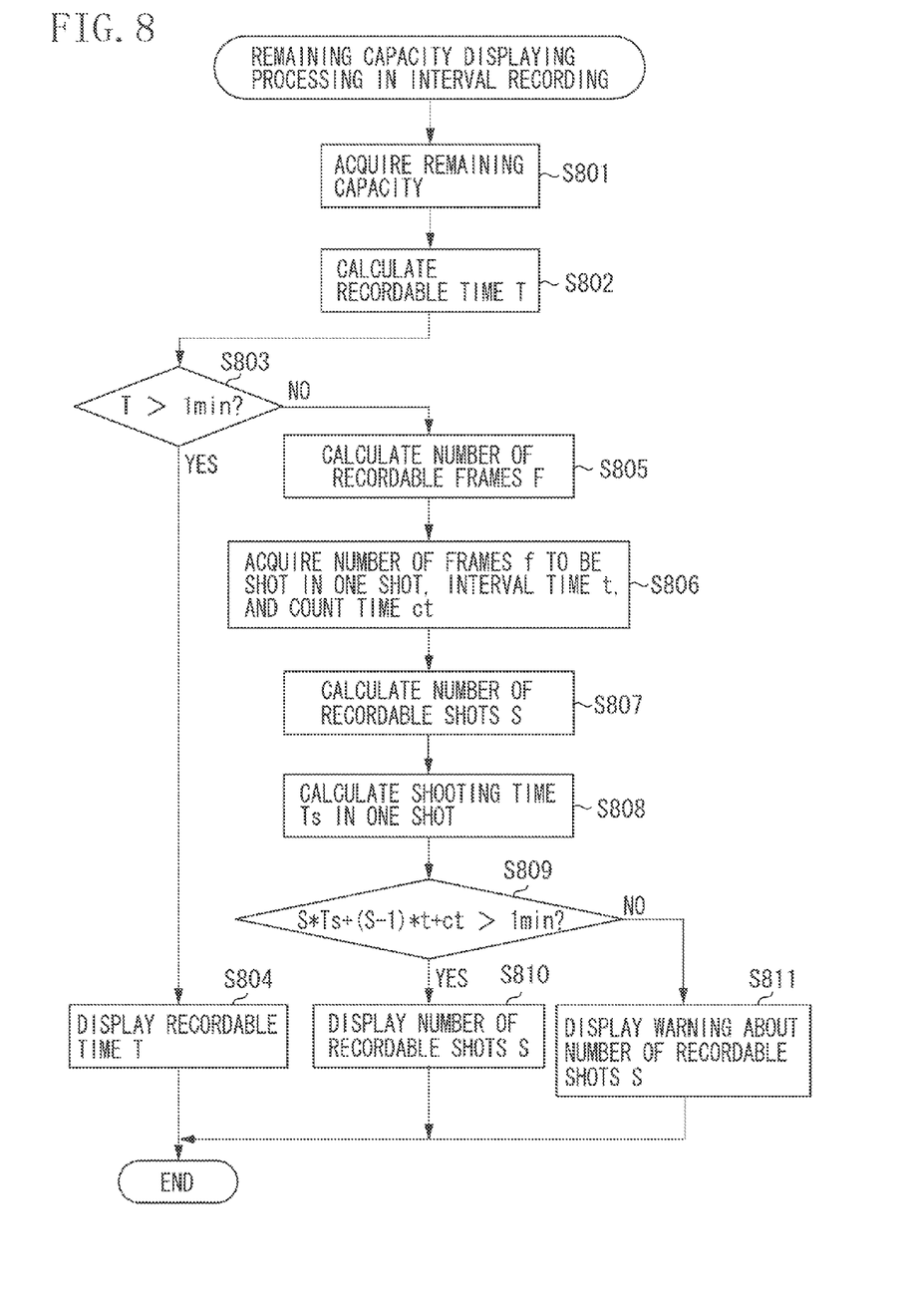
FIG. 8 is a flowchart illustrating remaining capacity display processing in an interval recording mode.

Next, with reference to FIGS. 2 to 4 and FIGS. 6 to 8, a method for displaying a remaining recordable capacity in the memory card (recording medium) in the DVC is described. Similarly to the above-described shooting processing, the processing in FIGS. 6 to 8 is executed by the CPU 102 by performing control of each unit in the DVC based on the program read from the program memory.

Remaining Capacity Display Processing in Normal Shooting Mode

First, remaining capacity display processing performed when the moving image shooting mode is in the normal shooting mode is described.

In step S601, when the remaining capacity display processing is started, the CPU 102 acquires information about a remaining capacity of the recordable capacity of the memory card 106 mounted in the DVC. In step S602, based on the remaining capacity of the memory card acquired in step S601 and shooting conditions such as a frame rate and a shooting size, the CPU 102 calculates recordable time T.

Figure 2A:
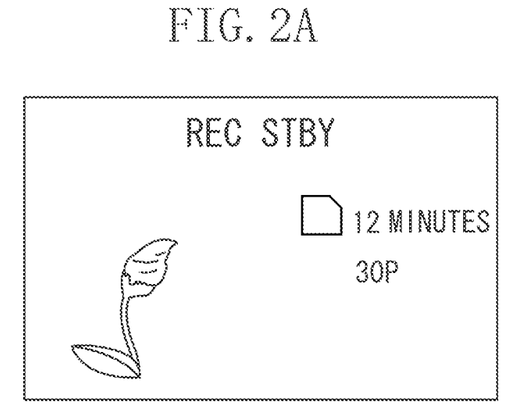
FIGS. 2A and 2B illustrate an example of a display of remaining recording capacity.

In step S603, the CPU 102 determines whether the recordable time T calculated in step S602 is greater than or equal to one minute, or less than one minute. If the recordable time T is greater than or equal to one minute (YES in step S603), in step S604, the recordable time T is indicated in black characters as illustrated in FIG. 2A, and the normal remaining capacity display is performed. If the recordable time T is less than one minute (NO in step S603), in step S605, the recordable time T is displayed in a warning state in red characters as illustrated in FIG. 2B.

Figure 2B:
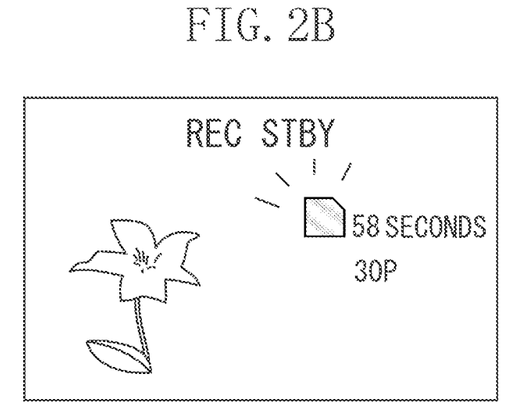

FIGS. 2A and 2B are examples of the remaining capacity display in the normal shooting mode. FIG. 2A is a display indicated when the recordable time is greater than or equal to one minute. In FIG. 2A, an icon indicating the memory card is displayed in green, and the recordable time T is displayed in black characters next to the icon. Under the recordable time T, the setting <30P> of the frame rate in the moving image shooting is displayed. FIG. 2B is a display indicated when the recordable time is less than one minute. In FIG. 2B, an icon indicating a secure digital (SD) card and the recordable time T next to the icon are displayed in red.

Remaining Capacity Display Processing in Frame Recording Mode

In the frame recording mode, in step S701, the CPU 102 acquires information about the remaining recordable capacity of the memory card 106 mounted in the DVC. In step S702, based on the remaining capacity of the memory card acquired in step S701 and shooting conditions such as a frame rate and a shooting size, the CPU 102 calculates the recordable time T.

Figure 3A:
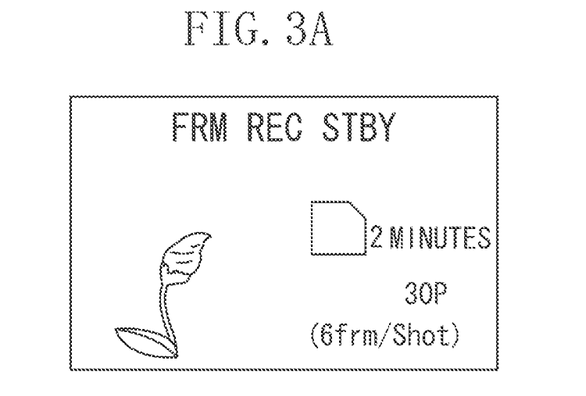
FIGS. 3A to 3C illustrate an example of the display of remaining recording capacity.

In step S702, when the recordable time is calculated, if the shooting is ended and moving image data that has not yet recorded in the memory card is temporarily recorded in the memory 103, such temporarily recorded data is also considered. The CPU 102 calculates the recordable time T in the memory card which is available after the temporarily recorded moving image is recorded in the memory card. In step S703, the CPU 102 determines whether the recordable time T calculated in step S702 is greater than or equal to one minute. If the recordable time T is greater than or equal to one minute (YES in step S703), then in step S704 the remaining capacity is displayed as the recordable time, as illustrated in FIG. 3A. The displaying method of the remaining capacity in FIG. 3A is similar to that in the normal remaining capacity display (in the case the remaining capacity is greater than or equal to one minute) in the normal shooting mode. However, in the case of the frame recording mode, a value of the set number of frames f is displayed together with the remaining capacity.

If the recordable time T is less than one minute (NO in step S703), in step S705, the CPU 102 calculates the number of recordable frames F based on the remaining capacity of the memory card and the shooting conditions such as the shooting time acquired in step S701. When the number of recordable frames F is calculated, similarly to the recordable time T, if the shooting is ended and moving image data that has not yet recorded in the memory card is temporarily recorded in the memory 103, the temporarily recorded data is also considered and calculated. The number of recordable frames F can be calculated by an expression, $$F=\text{<frame rate>}/\text{<recordable time } T\text{>}.$$

In step S706, the CPU 102 reads the setting of the number of frames f to be shot in one time (one shot) in the frame recording mode from the memory 103. In step S707, the CPU 102 calculates the number of times capable of shooting (the number of recordable shots) S indicating how many times a moving image including "f" frames can be shoot. The number of times capable of shooting S is obtained by the expression, S=F/f. The number of times capable of shooting S is a value obtained by rounding down the fractional portion of the value of F/f.

Figure 3B:
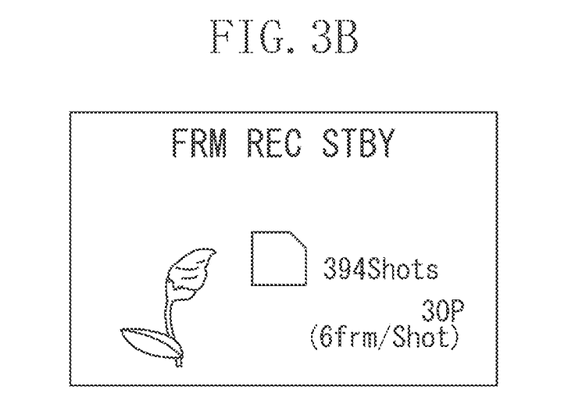

In step S708, the CPU 102 determines whether the number of times capable of shooting S is greater than 50 times. If the number of times capable of shooting S is greater than 50 times (YES in step S708), in step S709, the number of times capable of shooting S is displayed as the remaining capacity of the memory card, as illustrated in FIG. 3B. If the number of times capable of shooting S is less than or equal to 50 times, in step S710, the number of times capable of shooting S is displayed in the warning state in red characters, as illustrated in FIG. 3C.

Figure 3C:
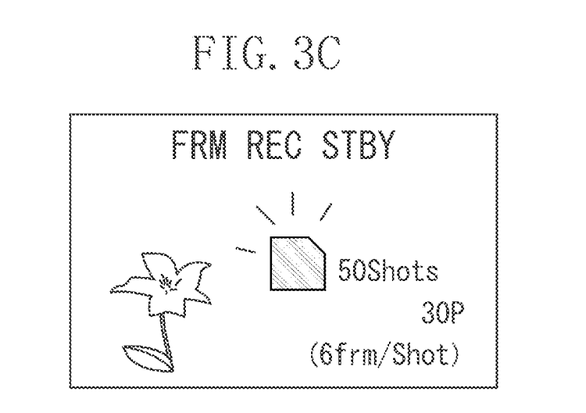

FIGS. 3A to 3C illustrate examples of the display of the remaining capacity on the display 104 in the frame recording mode. In the upper part of the screen, characters "FRM REC STBY" indicating the standby state in the frame recording mode are displayed. In FIG. 3A, as the remaining capacity of the memory card in the DVC, the recordable time of "2 MINUTES" is displayed in the upper right. In the lower right, the setting <30P> of the frame rate of the moving image is displayed. In the frame recording, different from the normal shooting, the setting <6frm/Shot> of the number of frames to be shot in one shot is also displayed.

In FIG. 3A, there is two or more minutes left in the recordable remaining time. Accordingly, the remaining capacity is displayed as recordable time by time unit on the screen. FIG. 3B illustrates the display in the case where the shooting is further continued from the state in FIG. 3A, and the remaining recordable time is less than one minute. Since the shooting can be continued if the remaining recordable time is less than one minute, and if the set number of frames f is small, still many shootings can be performed. Thus, not the recordable time but the number of times capable of recording is displayed.

More specifically, in the frame recording mode, the unit for the display of the remaining capacity is changed from the time to the number of times of shooting depending on the remaining capacity of the memory card. FIG. 3C illustrates the example of the display when the shooting is further continued, and the remaining number of times capable of recording is low. In order to indicate that the remaining number of times capable of recording is low, the number of recordable shots and the icon of the memory card are displayed in red characters and blinked as warning.

In the present exemplary embodiment, while the recordable time is indicated in black characters in the normal state, when the remaining capacity of the memory card is low and the warning is displayed, the recordable time is indicated in red characters. However, as long as the user can easily recognize the remaining capacity by differentiating the display of the normal remaining capacity from other display, any displaying method can be used. For example, colors, font types, frames, or background color in the display, and a display method such as blinking display can be changed and displayed.

As described above in the present exemplary embodiment, in the frame recording mode, when the remaining capacity of the memory card is less than or equal to a predetermined value, the remaining recording capacity is changed to the number of recordable shots instead of displaying the recordable time. However, instead of the number of recordable shots, the number of recordable frames can be displayed.

Further, in the frame recording mode, irrespective of the remaining capacity of the memory card, the number of recordable shots can be displayed instead of the recordable time. Furthermore, in the frame recording mode, both of the recordable time and the number of recordable shots can be displayed.

However, for example, in the frame recording mode, if the number of record frames in one shot is six frames, the frame rate is 30P, and the recordable time is one hour (=3600 seconds), the number of recordable shots can be calculated as follows.

the number of recordable shots=3600 (seconds)*30 (frames)/6 (frames)=18000 (times).

Then, the number of recordable shots is too huge. Moreover, if a user performs shooting in consideration of the recording time of a resulting moving image scene, it is difficult to grasp the time length. Then the user has to calculate the time length from the number of recordable shots to recognize the time length, and may feel troublesome.

Moreover, for example, if remaining time for shooting is one minute under the same conditions (the set number of frames f=six frames, and the frame rate=30P), the number of recordable shots is calculated as follows.

the number of recordable shots=60 (seconds)*30 (frames)/6 (frames)=300 (times).

Then, the remaining time for shooting is short, however, the number of times of shooting is enough.

Especially, when the recordable time is displayed only by minutes, although still no less than 300 shots can be taken, the recordable time is displayed as zero minute. Then, it is difficult for the user to recognize how many shots the memory card still can record.

Accordingly, when the remaining capacity of the memory card is large, the remaining capacity may be displayed by the recordable time because the number of times capable of shooting is a huge numerical value, and when the remaining capacity is small, the remaining capacity may be displayed by the number of times capable of shooting. Such display method enables the user to easily recognize the remaining capacity of the memory card.

In the present exemplary embodiment, the example in which either the recordable time or the number of recordable shots is displayed is described. However, generally, both of the recordable time and the number of recordable shots are displayed in the frame recording mode. Moreover, if the number of recordable shots is greater than a predetermined threshold, only the recordable time can be displayed. If the recordable time is less than a predetermined threshold, only the number of recordable shots can be displayed.

Remaining Capacity Display Processing in Interval Recording Mode

In the interval recording mode, processing performed from step S801 to step S805 in FIG. 8 is substantially the same as the processing from step S701 to step S705 in FIG. 7 in the frame recording mode. Accordingly, description of the steps is omitted. In the interval recording mode, if the number of recordable shots (the number of times capable of shooting) S is less than 50, processing different from that in the frame recording mode is performed. Thus, the processing is described.

In step S806, information pieces about the number of frames f to be shot in one shot, the interval time t, and the count time ct are acquired from the memory 103. In step S807, similarly to step S707, the number of times capable of shooting S is calculated from the number of recordable frames F and the set number of frames f. In step S808, from the frame rate, time Ts necessary for shooting in one shot (=<the set number of frames f>/<frame rate>) is calculated.

Figure 4A:
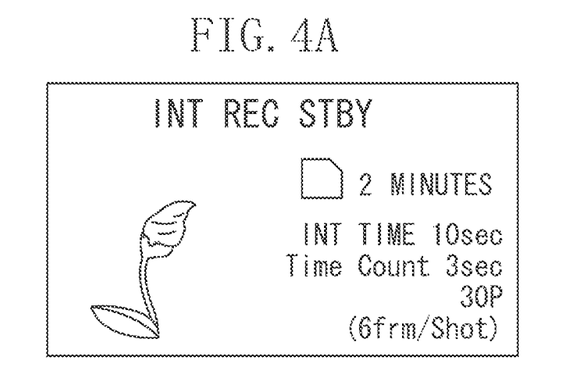
FIGS. 4A to 4C illustrate an example of the display of remaining recording capacity.
Figure 4B:
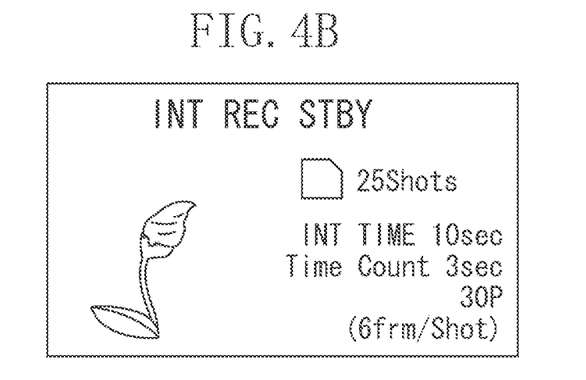
Figure 4C:
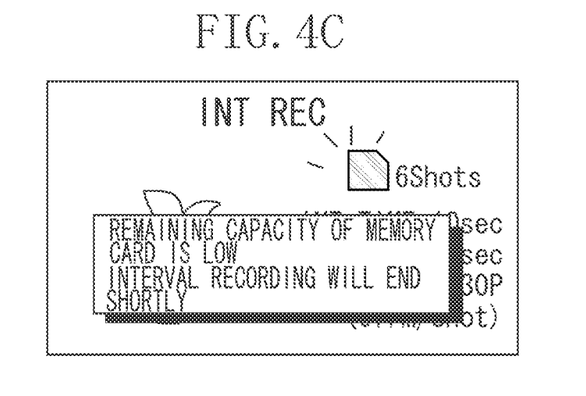

In step S809, the CPU 102 calculates time Te to the end of the interval recording ends due to shortage of the remaining capacity of the memory card (Te=S*Ts+(S−1)*(t+ct) and determines whether the time Te is less than one minute. If the time Te is greater than or equal to one minute (YES in step S809), then in step S810, the number of times capable of shooting S is displayed as illustrated in FIG. 4B. If the time Te is less than one minute (NO in step S809), then in step S811, the number of times capable of shooting S is displayed in the warning state as illustrated in FIG. 4C. Then, together with the warning-display of the number of times capable of shooting S, a warning indicating that the remaining capacity of the memory card is low and the interval recording mode will end shortly is displayed for the user.

As described above, in the frame recording mode, when the number of recordable times is less than 50 times, the warning is displayed. In the interval recording mode, when the capacity of the memory card is low, and the time Te to the end of the interval recording is less than one minute, the warning is displayed.

In the interval recording mode, the displaying method onto the display 104 is different from that in the frame recording mode. The displaying method in the interval recording mode is described with reference to FIGS. 4A to 4C. In FIGS. 4A to 4C, characters "INT REC STBY" indicating the standby state in the interval recording, or characters "INT REC" indicating that the DVC is in the interval recording is displayed on the upper part of the screen. Further, interval time (INT TIME), count display from a previous shot (Time Count), a frame rate, and setting of the number of frames to be shot in one time (shot) are displayed.

FIG. 4A illustrates an example of the remaining capacity display by the recordable time in step S804. The displaying method of the remaining capacity is similar to that in the frame recording mode. Accordingly, its description is omitted.

FIG. 4B illustrates an example of the remaining capacity display by the number of times capable of shooting S in step S810. If the recordable time T is less than one minute, the remaining capacity is displayed by the number of times capable of shooting S.

FIG. 4C illustrates an example of the remaining capacity display in step S811. If the remaining capacity of the memory card is low, and the time Te to the end of the interval recording is less than one minute, the icon of the memory card and the number of times capable of shooting are displayed in red and the blinking condition. In addition, a message indicating that the remaining capacity of the memory card is low and the interval recording mode will end shortly is displayed. In the present exemplary embodiment, the message indicating that the remaining capacity of the memory card will run out shortly is displayed. However, the state can be notified by sound. Alternatively, the time Te can be displayed to notify how many seconds are left until the interval recording ends.

In the interval recording mode, similarly to the frame recording mode, the remaining capacity is displayed by the number of times capable of shooting as illustrated in FIGS. 4B and 4C. However, in the interval recording mode, as illustrated in FIG. 4B, even though the number of recordable times is 25 times that is less than 50 times, the remaining capacity is not displayed in warning state.

This is because, in FIG. 4B, there are following conditions. the number of times capable of shooting S=25 (Shot), interval time t=10 (sec), count time ct=3 (sec), frame rate FR=30 (Frm/sec), and the set number of frames f=6 (frm/Shot) Accordingly, the time Te to the end of the shooting is calculated as follows.

$$Te = S*f/FR + (S-1)*t + ct$$
$$= 25*6/30 + (25-1)*10 + 3 = 248 \text{ (sec)}.$$

Then, Te=248 (sec)>1 (min). Accordingly, the warning is not displayed.

In FIG. 4C, the state is changed from that state in FIG. 4B, to the state in which the number of times capable of shooting S=6 (Shot), and count time ct=1 (sec) (the other values are previously set, and not changed). Then, the time Te to the end of the shooting is calculated as follows.

$$Te = 6*6/30 + (6-1)*10 + 1 = 52.2 \text{ (sec)}.$$

Accordingly, the time until the end time is less than one minute, and the warning is displayed.

In the interval recording mode, it is possible to calculate the time until the remaining capacity of the memory card will run out, the interval recording cannot be performed, and the time the interval recording ends by considering the interval time. Accordingly, the user can be notified that the time to the end of the interval recording is less than one minute. The user thus can check timing of replacement of the memory card, and the like.

As described above, when the remaining capacity of the memory card is displayed, the DVC determines the current recording mode, and according to the recording mode, performs one of the display processing illustrated in FIGS. 6, 7, and 8. The display processing can be repeatedly performed at predetermined intervals during shooting or shooting-standby to help the user recognize the remaining capacity of the memory card in real time.

For the processing of acquiring information about the frame rate, the set number of frames f, and the interval time t in step S706 in FIG. 7 and step S806 in FIG. 8, information acquired in step S506 or step S511 in FIG. 5 can be used.

In the above-described exemplary embodiment, the display is switched depending on whether the recordable time T is greater than or equal to one minute, the number of recordable times is greater than or equal to 50 times, or the time until recording is disabled is greater than or equal to one minute. However, the thresholds are not limited to those in the present exemplary embodiment, thresholds suitable for the apparatus can be set.

In the above-described exemplary embodiments, the video camera has been described as the example. However, functions similar to the present exemplary embodiments can be applied to a digital still camera or a mobile phone with a built-in camera that can perform shooting of a moving image. Moreover, the present invention can be applied to a computer that can communicate with a digital camera and remotely control operations of the digital camera. When the functions of the present exemplary embodiments of the present invention are implemented, the computer is to be operated such that the display illustrated in FIG. 2, 3, or 4 is displayed on a display unit of the computer or a display device connected to the computer.

Moreover, in the above-described exemplary embodiments, as the recording medium of the DVC, the memory card is employed. However, the present invention can be applied to other recording media such as a digital versatile disk (DVD) and a hard disk drive (HDD).

Moreover, the present invention can also be achieved by providing a software program implementing the functions of the above-described exemplary embodiments for a system or a device including a computer that can execute the program directly or by wired or wireless communication from a recording medium, and by executing the program with the computer of the system or the device.

Accordingly, the program code itself that is provided and installed in the computer to implement the functional processing according to the exemplary embodiments of the present invention constitutes the present invention. More specifically, the present invention includes the computer program itself that implements the functional processing according to the exemplary embodiments of the present invention.

In such a case, if the function of the program is implemented, the program may take any form, such as an object code, a program executed by an interpreter, or a script data to be supplied to an operating system (OS).

As the recording medium for supplying the program, for example, a hard disk, a magnetic recording medium such as a magnetic tape, an optical/magneto-optical recording medium, and a nonvolatile semiconductor memory may be employed.

The program may be supplied by storing the computer program constituting the present invention in a server on a computer network, and downloading and programming the computer program from a client computer being connected.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions. A part of the above-described exemplary embodiments may be combined with each other as needed.

This application claims priority from Japanese Patent Application No. 2010-082823 filed Mar. 31, 2010, which is hereby incorporated by reference herein in its entirety.

What is claimed is:

1. An imaging apparatus, comprising:
   an imager configured to shoot a moving image;
   a processor configured to perform recording control processing for recording the moving image shot by the imaging unit in a recording medium; and
   a display configured to display a time length available for recording a moving image in the recording medium as information about a remaining capacity of the recording medium,
   wherein, in a mode for shooting a predetermined number of frames in one shot, the display unit changes the display of the information about the remaining capacity of the recording medium to the number of shot times capable of shooting the predetermined number of frames if the time length available for recording a moving image becomes less than a predetermined time length.

2. The imaging apparatus according to claim 1, wherein the imaging apparatus includes a first moving image shooting mode for recording a moving image which is shot from an input of a shooting start instruction to an input of a shooting end instruction as one moving image file in the recording medium, and a second moving image shooting mode for shooting a moving image including the predetermined number of frames in one shot, and recording a plurality of moving images including the predetermined number of frames shot at time intervals as one moving image file in the recording medium.

3. The imaging apparatus according to claim 2, wherein, in the first moving image shooting mode, if the time length available for recording a moving image becomes less than the predetermined time, the display unit displays a warning for notifying that the remaining capacity of the recording medium is low, and in the second moving image shooting mode, if the number of times capable of shooting a moving image including the predetermined number of frames becomes less than the predetermined number of times, the display unit displays a warning for notifying that the remaining capacity of the recording medium is low.

4. The imaging apparatus according to claim 1,
   wherein the imaging apparatus includes a first moving image shooting mode for recording a moving image which is shot from an input of a shooting start instruction to an input of a shooting end instruction as one moving image file in the recording medium, and a second moving image shooting mode for shooting a moving image including the predetermined number of frames in one shot, and recording a plurality of moving images which includes the predetermined number of frames and are shot at time intervals as one moving image file in the recording medium, and
   wherein the display unit displays the time length available for recording a moving image if the time length available for recording a moving image is greater than a predetermined time length, displays a warning of the time length available for recording a moving image if the time length available for recording a moving image becomes less than the predetermined time length in the first moving image shooting mode, displays the number of times capable of shooting a moving image including the predetermined number of frames if the time length available for recording a moving image becomes less than the predetermined time length in the second moving image shooting mode, and displays a warning of the number of times capable of shooting a moving image including the predetermined number of frames if the number of times capable of shooting a moving image including the predetermined number of frames becomes less than the predetermined time in the second moving image shooting mode.

5. The imaging apparatus according to claim 2,
   wherein, in the first moving image shooting mode, the imaging apparatus records a moving image shot from an input of a shooting start instruction to an input of a shooting end instruction as one moving image file in the recording medium, and
   wherein, in the second moving image shooting mode, the imaging apparatus shoots a moving image including the predetermined number of frames in response to an input of a shooting start instruction, and records a plurality of moving images which include the predetermined number of frames and are shot at a plurality of shots as one moving image file in the recording medium.

6. The imaging apparatus according to claim 2, wherein the second moving image shooting mode includes a third moving image shooting mode for starting shooting of a moving image including the predetermined number of frames in response to an input of a shooting start instruction, and a fourth moving image shooting mode for starting shooting of a next moving image including the predetermined number of frames after a lapse of predetermined time from an end of previous shooting of the moving image including the predetermined number of frames.

7. The imaging apparatus according to claim 6, wherein, in the fourth moving image shooting mode, the imaging apparatus displays a time length until the shooting cannot be continued any more based on the remaining capacity of the recording medium.

8. The imaging apparatus according to claim 7, wherein the display unit displays the time length available for recording a moving image if the time length available for recording a moving image is greater than a predetermined time length, displays a warning of the time length available for recording a moving image if the time length available for recording a moving image becomes less than the predetermined time length in the first moving image shooting mode, displays the number of times capable of shooting a moving image including the predetermined number of frames if the time length available for recording a moving image becomes less than the predetermined time length in the third moving image shooting mode, displays a warning of the number of times capable of shooting a moving image including the predetermined number of frames if the number of times capable of shooting a moving image including the predetermined number of frames becomes less than the predetermined time in the third moving image shooting mode, displays the time length until the shooting cannot be continued any more if the time length available for recording a moving image becomes less than the predetermined time in the fourth moving image shooting mode, and display a warning if the time length until the shooting cannot be continued anymore becomes less than predetermined time in the fourth moving image shooting.

9. The imaging apparatus according to claim 6, wherein, in the fourth moving image shooting mode, if a moving image including the predetermined number of frames cannot be recorded in the recording medium, the imaging apparatus ends the fourth moving image shooting mode.

10. An imaging apparatus comprising:
    an imager configured to shoot a moving image;

a processor configured to perform recording control processing for recording the moving image shot by the imaging unit in a recording medium; and a display configured to display a time length available for recording a moving image in the recording medium based on information about a remaining capacity of the recording medium, wherein, if the time length available for recording a moving image becomes less than a predetermined time length, the display unit changes the display from the time length available for recording a moving image in the recording medium to information about the number of frames that can be recorded in the recording medium.

11. A method for controlling an imaging apparatus, the method comprising:

shooting a moving image;

recording the shot moving image in a recording medium; and displaying a time length available for recording a moving image in the recording medium as information about a remaining capacity of the recording medium; and changing the display of the information about the remaining capacity of the recording medium to the number of times capable of shooting including a predetermined number of frames if the time length available for recording a moving image becomes less than predetermined time in a moving image shooting mode for shooting a moving image including the predetermined number of frames in one shot.

12. A method for controlling an imaging apparatus, the method comprising:

shooting a moving image;

recording the shot moving image in a recording medium;

displaying a time length available for recording a moving image in the recording medium based on information about a remaining capacity of the recording medium; and changing the display from the time length available for recording a moving image in the recording medium to information about the number of frames that can be recorded in the recording medium if the time length available for recording a moving image becomes less than a predetermined time length.

* * * * *